United States Patent
Nakamura

(10) Patent No.: US 7,342,680 B2
(45) Date of Patent: Mar. 11, 2008

(54) IMAGE READING APPARATUS

(75) Inventor: Yoichi Nakamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 685 days.

(21) Appl. No.: 10/959,346

(22) Filed: Oct. 7, 2004

(65) Prior Publication Data
US 2005/0088674 A1 Apr. 28, 2005

(30) Foreign Application Priority Data
Oct. 14, 2003 (JP) ............................. 2003-353804

(51) Int. Cl.
G06F 15/00 (2006.01)
H04N 1/387 (2006.01)
(52) U.S. Cl. ........................ 358/1.6; 358/450
(58) Field of Classification Search .............. 358/1.6, 358/1.7, 1.9, 1.18, 1.12, 505, 474, 450
See application file for complete search history.

(56) References Cited

U.S. PATENT DOCUMENTS 5,155,596 A * 10/1992 Kurtz et al. .................. 348/97
5,932,861 A * 8/1999 Iwaguchi et al. ............ 235/455
6,657,653 B2 * 12/2003 Nakatsuka et al. .......... 347/246
RE39,226 E * 8/2006 Lappe ......................... 235/375

FOREIGN PATENT DOCUMENTS

JP       2003-5545 A       1/2003

* cited by examiner

Primary Examiner—Douglas Q. Tran
(74) Attorney, Agent, or Firm—Sughrue Mion, PLLC

(57) ABSTRACT

The present invention provides an image reading apparatus capable of reading images with a sufficiently wide dynamic range. An image reading apparatus of this invention has a light source, a reading section which generates image data based on light obtained from an original illuminated with light from the light source, a first level changing section which changes a light receiving level in the reading section in a first manner, a second level changing section which changes the light receiving level in a second manner different from the first manner, a control section in which plural light receiving levels are generated by synergistically changing a light receiving level, and a combining section which combines plural image data obtained by reading an image of an original at plural light receiving levels.

6 Claims, 12 Drawing Sheets

IMAGE READING APPARATUS

BACKGROUND OF THE INVENTION

1. Field of the Invention

The present invention relates to an image reading apparatus which reads original images and generates image data representing the original images.

2. Description of the Related Art

Image reading apparatuses which read an original image by illuminating it with light and collecting the light reflected from or transmitted through it have conventionally been in wide use. A photographic digital printer to print out images recorded on a photographic film, for example, has a film scanner which reads images recorded on a photographic film by receiving light applied to and transmitted through the photographic film using image pickup devices such as CCDs. The resultant images read by the film scanner are sent to a printer incorporated in the photographic digital printer and then printed out.

Generally, the range of density (hereafter referred to as a dynamic range) that can be read by an image pickup device is narrower than the dynamic range that can be recorded on a photographic film. Therefore, the problem is that when image data generated by scanning an original. image using a film scanner is printed as it is, the printed image shows a low density contrast as compared with an image printed by directly exposing a photographic image recorded on a photographic film. In terms of an image pickup device, the smaller the device is, the narrower its dynamic range is. However, since the price of an image pickup device increases with its size, there is a demand for using smaller ones to reduce the cost of digital photographic printer.

As a way to solve the above problems, a method of image input designed to make an image with a wide dynamic range available is disclosed in Japanese Patent Laid-Open No. 2003-5545. In the disclosed method, electric charge accumulation times are changed in the image pickup device, image data are generated for an image under the plural charge accumulation conditions, and image data to be used is selected from the plural image data for every pixel. In this way, it is possible to obtain an image with a wide dynamic range using small image pickup devices.

When the method disclosed in Japanese Patent Laid-Open No. 2003-5545 is applied, the dynamic range of the image to be finally obtained can be widened by increasing the difference between electric charge accumulation times in the plural charge accumulation conditions. The ratio between the electric charge accumulation times should preferably be at least on the order of 1:4, and more preferably 1:16 to generate image data for each charge accumulation condition.

However, to achieve the preferable ratio as mentioned above, one of the electric charge accumulation times must be set very long. Setting a very long electric charge accumulation time results in more time required to read an image and, eventually, lower productivity. Also, generating an image by using image data selected from plural image data may cause shifting in color gradation, making the generated image look unnatural in its color-gradated parts.

Besides the method disclosed in Japanese Patent Laid-Open No. 2003-5545, there is also a method in which the amount of light emitted from a light source is changed by controlling pulse-width modulation to enable plural image data to be generated using different amounts of light. Similarly as described above, image data to be used is selected from the plural image data for every pixel. Since the adjustability of pulse-width modulation is limited, however, it will be difficult by this method to achieve an ideal ratio (about 1:16) of light.

The present invention has been made in view of the above circumstances and provides an image reading apparatus capable of reading images with a sufficiently wide dynamic range.

SUMMARY OF THE INVENTION

The image reading apparatus according to the invention includes:

a light source which emits light to illuminate an original, a reading section which reads an image of the original by receiving light coming from the original illuminated with light emitted from the light source and generates image data representing the image, a first level changing section which changes a light receiving level in the reading section in a first manner used in an imaging system from the light source to the reading section, a second level changing section which changes the light receiving level in a second manner different from the first manner and used in the imaging system from the light source to the reading section, a control section in which plural light receiving levels are generated by having the light receiving level changed synergistically by the first and the second level changing sections and which causes the reading section to read the image at each of the plural light receiving levels, and a combining section which combines plural image data obtained by reading the image at each of the plural light receiving levels.

The first and the second manners each refer to a method of changing a light receiving level. Such a method may be, for example, adjusting an electric current or voltage, or pulse-width modulation for the light source, adjusting a lens diaphragm, or inserting an ND filter or other devices for controlling light transmission factor.

To obtain an image with a sufficient dynamic range, it is preferable to combine plural image data obtained at plural light receiving levels with the ratio between the plural light receiving levels being about 1:16. Achieving such a ratio between plural light receiving levels by a single method, for example, by reading an image using different electric charge accumulation times is difficult. Even if it can be done, such a method increases the time required for image reading and leads to lower productivity.

In the image reading apparatus according to the invention, plural light receiving levels are generated by having a light receiving level synergistically changed by the first and the second level changing sections and plural image data obtained by reading an image at each of the plural light receiving levels are combined into one set of data. An ideal ratio between light receiving levels of 1:16 can be achieved with ease, for example, by combined use of a first manner in which a ratio of 1:4 between light receiving levels can be achieved by adjusting a lens diaphragm and a second manner in which a ratio of 1:4 between light receiving levels can be achieved by adjusting electric charge accumulation times. As compared with generating plural light receiving levels only by controlling electric charge accumulation times, generating plural light receiving levels by the combined use of the first and the second manners allows image reading to be completed faster leading to productivity improvement.

It is preferable that the combining section included in the image reading apparatus according to the invention be capable of giving a predetermined weight to each of plural predefined parts of an image in the same way for plural image data and combining plural weighted image data to generate a new set of image data.

An image with a wide dynamic range free of tone jumps can be obtained by combining plural image data with a predetermined weight given to each of plural predefined parts of each set of image data.

In the image reading apparatus according to the invention, it is also preferable that the "each" of plural predefined parts of an image represent a minimum unit of the reading resolution of the reading section.

When combining plural image data with a predetermined weight given to each pixel which is a minimum unit of the reading resolution of the reading section, finer dynamic range and gradation adjustments are enabled so that higher-quality images can be obtained.

In the image reading apparatus according to the invention, the value of each predetermined weight is preferred to be dependent on an image data value.

When each predetermined weight is controlled according to the image data value, it is possible to reliably prevent color gradation from shifting so that smoothly graded images free of tone jumps can be obtained.

The image reading apparatus according to the invention is preferred to include an original feeding section which sequentially feeds plural originals to a reading position in the reading section where an image is read and which keeps still each original while an image thereof is being read in the reading position. Furthermore, while an original is kept still in the reading position by the original feeding section, the control section included in the image reading apparatus is preferred to generate plural light receiving levels.

If an image is transported each time when it is to be read in the first manner and when it is to be read in the second manner, a delicate image positioning error may occur to result in shifted image data reflecting the image positioning error. In the above preferred embodiment of the image reading apparatus according to the invention, each image is read in the first and the second manners while being kept still so that plural image data can be generated with high positional accuracy. As a result, high-quality images without blurring due to positional errors can be obtained.

Furthermore, it is preferable:

that the image reading apparatus according to the invention includes an optical path splitting section which splits an optical path formed by the light coming from the original image into plural paths, that the reading section includes plural reading elements which read an image of the same original respectively via the plural paths generated by splitting the optical path by the optical path splitting section, that the first level changing section unequalizes the plural light receiving levels at the plural reading elements, that the second level changing section also unequalizes the plural light receiving levels at the plural reading elements, and that the control section causes the plural light receiving levels to be generated simultaneously for the plural reading elements by the first and the second level changing sections and causes the plural reading elements to read the image of the same original simultaneously at each of the plural light receiving levels.

By reading an image with plural reading elements at plural light receiving levels simultaneously rather than reading it at each of the plural light receiving levels sequentially, the reading operation can be made faster to eventually improve productivity.

The invention can provide an image reading apparatus capable of reading images with a sufficiently wide dynamic range.

DETAILED DESCRIPTION OF THE INVENTION

In the following, preferred embodiments of the invention will be described in detail.

Figure 1:
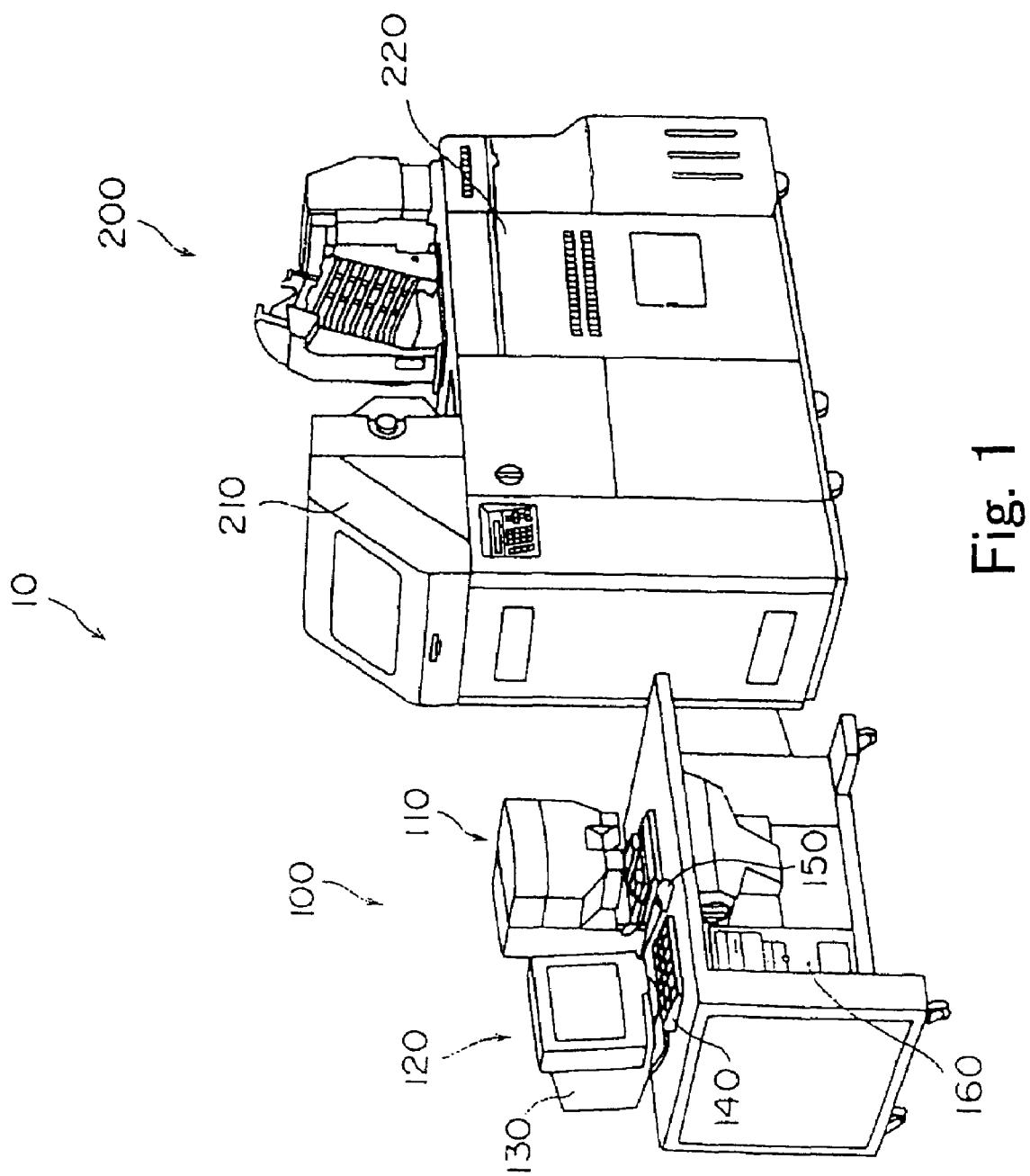
FIG. 1 is a perspective view showing an external appearance of a digital photographic printer which prints photographic images based on digital image data according to an embodiment of the invention.

FIG. 1 is a perspective view showing an external appearance of a digital photographic printer which prints photographic images based on digital image data according to an embodiment of the image reading apparatus of the invention.

A digital photographic printer 10 obtains photographic image data by optically reading photographic images recorded on a photographic film. It can also read out photographic image data taken and recorded on a small recording medium, for example, by a digital camera, correct the photographic image data as required, and make photographic prints of the corrected image data.

The digital photographic printer 10 includes image input equipment 100 and image output equipment 200 according to an embodiment of the invention.

The image input equipment 100 has a scanner section 110 which photoelectrically reads plural photographic images recorded on a developed film sequentially frame by frame and an image correction section 120 which corrects the photographic image data obtained by the scanner section 110. The image correction section 120 includes a CRT display section 130, a keyboard 140, a mouse 150, and a circuit section 160. The circuit section 160 has a small storage medium insertion slot (not shown) and a floppy disk insertion slot (not shown). Sections included in the image input equipment 100 will be described in detail later.

The image output equipment 200 includes a laser printer section 210 which exposes images on a photographic paper by scanning a laser light beam modulated based on image data obtained by the image input equipment 100 and a processor section 220 which makes photographic prints by developing the photographic paper exposed in the laser printer section 210. The internal structure of the image output equipment 200 will also be described later.

In the following, the structure of the scanner section 110 included in the image input equipment 100 and a procedure for reading photographic images recorded on a photographic film will be described.

Figure 2:
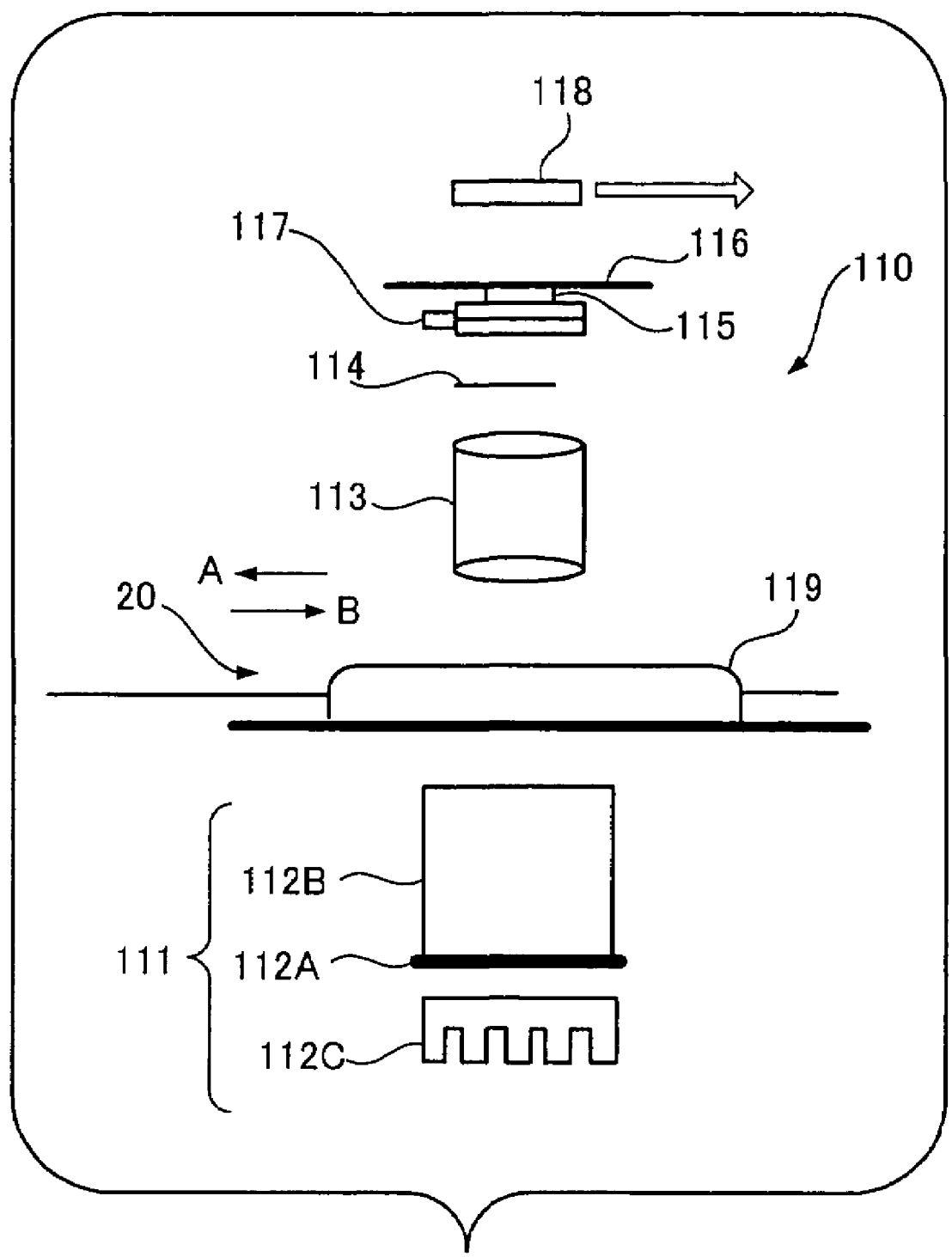
FIG. 2 is a view showing the structure of a scanner section included in image input equipment.

FIG. 2 is a view showing the structure of the scanner section included in the image input equipment.

In the scanner section, a developed photographic film 20 is set on a film carrier 119 and fed in the direction of arrow A causing photographic images recorded on the photographic film 20 to be rapidly and coarsely read frame by frame (this reading operation will hereafter be referred to as prescanning). The film carrier 119 constitutes an example of an original feeding section included in the image reading apparatus according to the invention.

The scanner section 110 has a light source unit 111 which includes an LED light source 112A, a diffusion box 112B and a heat regulator 112C. The light source unit 111 constitutes an example of a light source included in the image reading apparatus according to the invention. The light source unit 111 sequentially emits red, green, blue, and infrared light beams to illuminate via the diffusion box 112B the photographic film 20 from below as shown in FIG. 2. Each of the light beams transmitted through the photographic film 20 reaches a CCD 115 and a CCD board 116 via an image pickup lens 113 and an ND filter 114 which adjusts the light amount of each light beam. The CCD 115 and the CCD board 116 combined constitute an example of a scanning section included in the image reading apparatus according to the invention. The image pickup lens 113 is driven by an image pickup lens driving section (not shown) so that its focal length is adjusted and each image according to a ratio dependent on the adjusted focal length of the image pickup lens 113 is formed on the sensor surface of the CCD 115. When an image recorded on the photographic film 20 is formed on the CCD 115, a photographic image signal representing the image is generated. The photographic image signal is converted into digital photographic image data by an A/D converter 118 and sent to the image correction section 120.

The CCD 115 is an area sensor which reads the photographic film 20 frame by frame. In the present embodiment, when the light source 111 emits a red light beam, a frame of image is read with the red light beam. When the light source 111 next emits a green light beam, the same frame of image is read with the green light beam. In a similar fashion, when a blue light beam is emitted, the same frame of image is read with the blue light beam and when an infrared light beam is emitted, the same frame of image is read with the infrared light beam. The image data obtained by reading the frame of image with the infrared light beam does not represent photographic image data recorded on the frame of the photographic film 20. What is obtained with the infrared light beam is scratch data representing scratches on the frame of the photographic film 20. The photographic image data and the scratch data obtained are sent to the image correction section 120 shown in FIG. 1. In the image correction section 120, various corrections are applied to the photographic image data to correct flaws due to scratches on the photographic film 20 and generate photographic image data representing a beautiful-looking image. When the frame of image has been read with each of the four light beams, the photographic film 20 is fed in the direction of arrow A to have the next frame of image read.

When an image is prescanned, only every other light-sensitive element included in the CCD 115 is used so that a coarse image is obtained. The photographic image generated by prescanning and a prepared condition setting screen are displayed in the CRT display section 130 shown in FIG. 1. By checking the photographic image and the condition setting screen displayed in the CRT display section 130, the operator can specify conditions for image acquisition such as a print size and a resolution. When the required conditions for image acquisition are specified, the focal length of the image pickup lens 113 is adjusted, as required, depending on the specified print size. The photographic film 20 is next fed in the direction of arrow B and the photographic image is read by the CCD 115 using as many light-sensitive elements as required according to the specified print size (or at a specified resolution) (image reading in this manner will hereafter be referred to as fine scanning). A piezoelectric device for position shifting 117 can shift the image reading position, for example, precisely by ½ pixel. Combining an image generated by reading a photographic image at the initial reading position and another image generated by reading the same photographic image at a shifted reading position makes it possible to obtain an image with a higher resolution than the resolution of the CCD 115. The piezoelectric device 117 determines the amount of shifting the reading position according to the specified resolution. The photographic image signal generated at the CCD 115 is, as stated previously, converted into digital photographic image data by the A/D converter 118 and then sent to the image correction section 120.

In the following, the structure of the circuit section 160 included in the image correction section 120 of the image input equipment 100 will be described.

Figure 3:
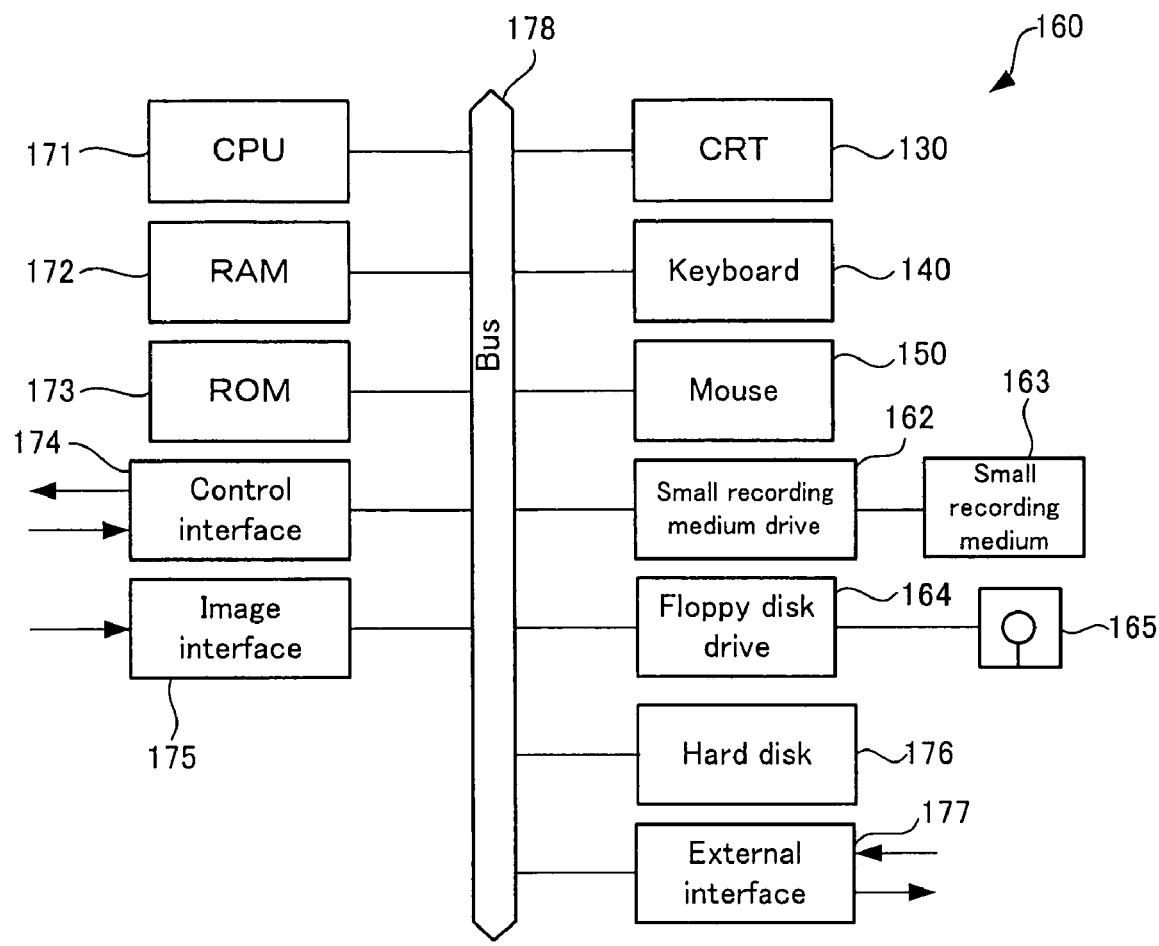
FIG. 3 is a block diagram of a circuit section included in an image correction section of the image input equipment.

FIG. 3 is a block diagram of the circuit section included in the image correction section of the image input equipment.

The circuit section 160 includes a CPU 171 which executes various programs and performs various types of control, a RAM 172 which is used as a work area when various programs are executed, a ROM 173 which stores fixed constants, a control interface 174 which inputs and outputs control signals required to control different sections included in the image input equipment 100, an image interface 175 through which images are input from the scanner section 110 shown in FIG. 2, the CRT display section 130, the keyboard 140 and the mouse 150 shown in FIG. 1, a small recording medium drive 162 which accesses a small recording medium 163, a floppy disk drive 164 which accesses a floppy disk 165, a hark disk 176, and an external interface 177 which undertakes data transmission and reception to and from the image output equipment 200 shown in FIG. 1, all of which are interconnected via a bus 178. The CPU 171 constitutes an example of a control section and also an example of a combining section both included in the image reading apparatus according to the invention.

In the present embodiment, the control interface 174 sends control signals to the elements shown in FIG. 2. The elements shown in FIG. 2 feed the photographic film 20, adjust the LED light source 112A and adjust the focal length of the image pickup lens 113 (adjust the enlargement ratio for image formation) in accordance with the control signals received from the control interface 174.

Control signals required to control the CCD 115 and different sections of the image input equipment 100 are also output from the control interface 174.

Furthermore, various data and conditions for image acquisition specified by the operator are also sent from the control interface 174 to the CPU 171.

The image input equipment 100 is basically configured as described above.

When reading a photographic image recorded on a photographic film in the image input equipment 100 shown in FIG. 1, the photographic image is prescanned in the scanner section 110, and the photographic image generated by prescanning is input to the circuit section 160 (see FIG. 3) via the image interface 175 to be displayed in the CRT display section 130. When the operator specifies conditions for image acquisition such as an enlargement ratio for printing, the relevant information incorporating the specified conditions for image acquisition is sent to the CPU 171 (see FIG. 3). The photographic image recorded on the photographic film is also fine-scanned in the scanner section 110 and the photographic image generated by fine-scanning is then input to the CPU 171 for various kinds of correction processing. The corrected image output from the CPU 171 is sent to the image output equipment 200 to be used as a laser light modulation signal in a laser light exposure process.

When, instead of reading a photographic image recorded on a photographic film in the scanner section 110, inputting a photographic image from the small recording medium 163, shown in FIG. 3, on which the photographic image, for example, taken by a digital camera is recorded, the photographic image data is input to the circuit section 160 via the small recording medium drive 162 and the photographic image is displayed in the CRT display section 130 shown in FIG. 1. The photographic image data is also sent to the CPU 171 via the image interface 175. When the operator subsequently specifies conditions for image acquisition, the relevant information incorporating the specified conditions for image acquisition is sent to the CPU 171 for various kinds of correction processing as in the case of reading a photographic image from a photographic film. The corrected image output from the CPU 171 is sent to the image output equipment 200.

Next, the structure of the image output equipment 200 and a procedure for making photographic prints of photographic images input to the image output equipment 200 will be described in the following.

Figure 4:
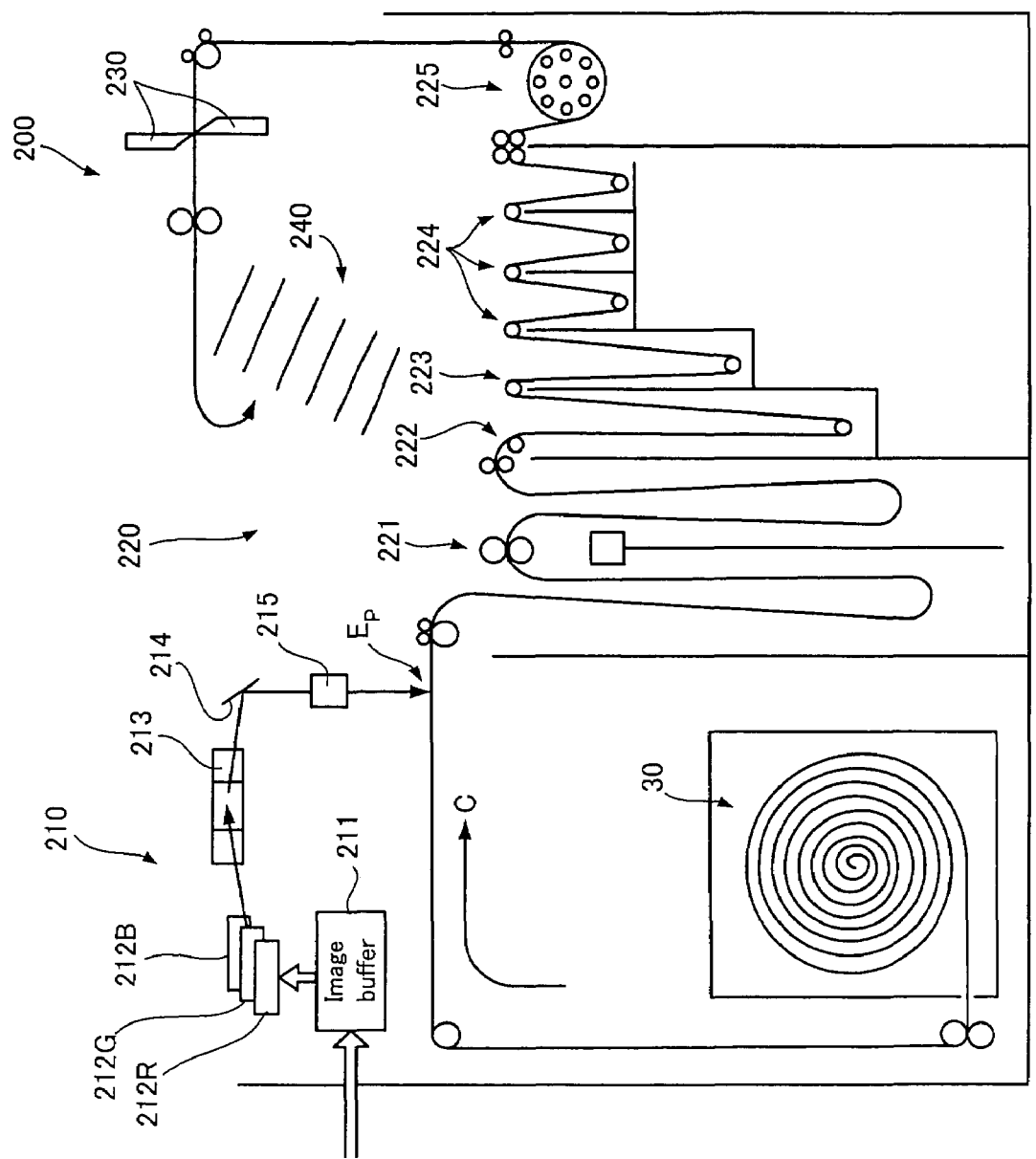
FIG. 4 is a view showing the internal structure of image output equipment.

FIG. 4 is a view showing the internal structure of the image output equipment.

A lengthy unexposed sheet of photographic paper 30 is wound around inside the image output equipment 200 passing through various parts of the image output equipment. The photographic paper 30 being led by its leading edge is guided to pass the laser printer section 210 and the processor section 220. A cutter 230 then cuts the photographic paper into individual frames to be stacked in a sorter 240.

When an image is output from the CPU 171 included in the image input equipment 100 and sent to the image output equipment 200, it is once stored in an image buffer 211 included in the laser printer section 210.

The laser printer section 210 includes three laser light sources 212R, 212G and 212B which emit red, green and blue laser light beams, respectively. The laser light sources 212R, 212G and 212B are driven based on the red, green and blue color-separated images stored in the image buffer 211 and emit laser light beams that are modulated as the laser light sources are driven. These laser light beams are repeatedly polarized by being reflected by a rotary polygonal mirror 213 and are then reflected by a mirror 214 to pass through an fθ lens 215 which adjusts the light spot diameter on the photographic paper 30. In an exposure section Ep, the laser light beams repeatedly scan the photographic paper 30 in the direction of the width of the photographic paper 30 while the photographic paper 30 is transported in the direction of arrow C causing the photographic image to be exposed on the photographic paper 30.

The photographic paper 30 having been exposed is transported to the processor section 220. In the processor section 220, the photographic paper 30 is transported through a reserver section 221 in which the photographic paper transport speed is adjusted, a developing bath 222 in which chromogenic development is performed, a fixing bath 223 in which bleach fixing is performed, a rinsing bath 224 in which rinsing is performed, and a drying section 225 in which drying is performed. The photographic paper 30 is then cut into individual frames by the cutter 230 to be stacked in the sorter 240 as previously described.

The image data generated in the image input equipment 100 is photographically printed in the image output equipment 200 as described above.

Through the series of processing as described above, the photographic image recorded on the photographic film 20 or on the small recording medium 163 is printed out.

There is a problem, however. Since the dynamic ranges of image pickup devices such as CCDs are narrower than those of photographic films, photographic images printed by conventional digital photographic printers lack in contrast density as compared with photographic images obtained by directly exposing the photographic film 20.

Figure 5:
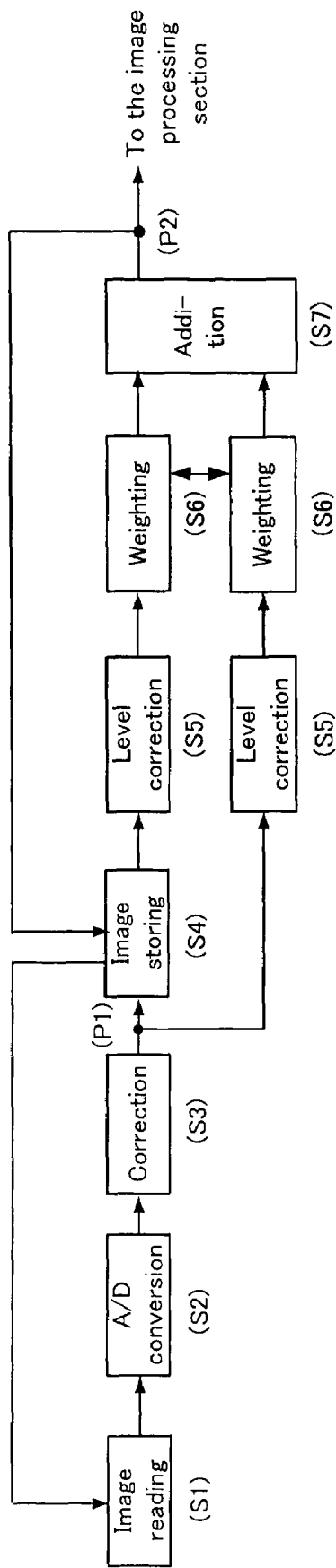
FIG. 5 is a flowchart showing a series of image reading processing performed to obtain a photographic image having a wide dynamic range.

FIG. 5 is a flowchart showing a series of image reading processing performed to obtain a photographic image having a wide dynamic range. In the following, a series of processing performed in the image input equipment 100 will be described in detail with reference to FIGS. 2, 3 and 5.

As described above, in the series of processing, each photographic image is prescanned and then fine-scanned.

First, the light source unit 111 emits a red light beam causing the ND filter 114 to be inserted in position by an order from the CPU 171. In this state, the ND filter 114 attenuates the red light beam to illuminate the CCD 115 thereby adjusting the red light receiving level at the CCD 115 to the LR1 level. The ND filter 114 constitutes an example of a first level adjusting section included in the image reading apparatus according to the invention. In the way stated above, each of the photographic images recorded on the photographic film 20 is finely read (step S1 in FIG. 5).

When a photographic image signal is generated by reading a photographic image recorded on the photographic film 20, it is converted into digital photographic image data by the A/D converter 118 (step S2 in FIG. 5). The digital photographic image data is then sent to the CPU 171 shown in FIG. 3.

The photographic image data sent to the CPU 171 is subjected to various kinds of correction processing such as pixel-by-pixel sensitivity adjustment correction and shading correction (step S3 in FIG. 5). These kinds of corrections have been widely conducted so that they are not further described herein.

The photographic image data coming through the correction processing advances to step S4 via a branch point P1 to be temporarily stored in the hard disk 176 shown in FIG. 3.

Next, the light source unit 111 emits a red light beam again. This time, unlike at the previous time, the ND filter 114 is moved out of position by an order from the CPU 171 so as not to block the optical path. Also, by an order from the CPU 171, the amount of light emitted from the light source unit 111 is adjusted by adjusting pulse-width modulation and the red light receiving level at the CCD 115 is adjusted to the LR2 level. The light source unit 111 constitutes an example of a second level adjusting section included in the image reading apparatus according to the invention. In the present embodiment, the ratio of the light receiving level LR1 attained at the previous time to the light receiving level LR2 attained this time is adjusted to be 1:16. In this state, the photographic image recorded on the photographic film 20 is read for the second time (step S1 in FIG. 5, for the second time).

The photographic image signal generated by reading the photographic image recorded on the photographic film 20 is, as at the previous time, converted into digital photographic image data by the A/D converter 118 (step S2 in FIG. 5, for the second time). The digital photographic image data is then sent to the CPU 171 shown in FIG. 3 and is subjected to various kinds of correction processing (step S3 in FIG. 5, for the second time).

This time, the photographic image data coming through correction processing advances to step S5 via branch point P1 without being temporarily stored.

The photographic image data recorded on the hard disk 176 at the previous time (hereafter referred to as the LR1 data being the photographic image data obtained with a light receiving level of LR1) and the photographic image data obtained at this time (hereafter referred to as the LR2 data being the photographic image data obtained with a light receiving level of LR2) are subjected to level corrections (step S5 in FIG. 5) for level alignment between the two photographic image data. The level corrections have been widely conducted so that they are not further described herein.

The LR1 data and the LR2 data having been subjected to level corrections next undergo weighting (step S6 in FIG. 5).

There are cases in which the signal-to-noise ratio (S/N ratio) of a photographic image signal generated by reading a dark photographic image is too small and the image printed from the image signal is blurry. There are also cases in which reading a bright photographic image results in an excessively large image data value to saturate the image consequently obtained. Therefore, of the LR1 data and the LR2 data, the LR2 data with a large image data value and a large S/N ratio is more reliable when reading a dark photographic image. On the other hand, when reading a bright photographic image, the LR1 data with a small image data value that does not saturate the image to be obtained is more reliable.

Figure 6:
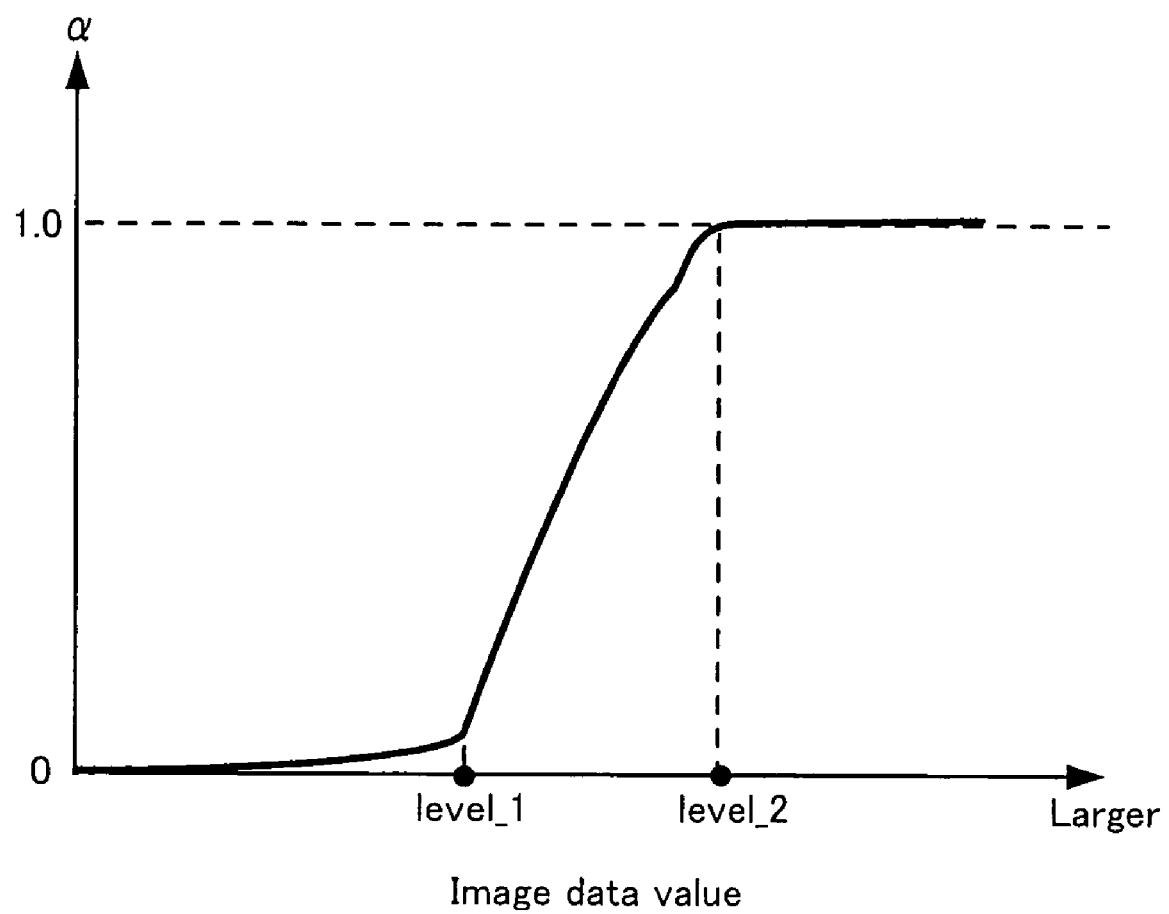
FIG. 6 is a diagram showing the relationship between the value of LR1 data and the weighting factor for LR1 data.

FIG. 6 is a diagram showing the relationship between the value of the LR1 data and the weighting factor for the LR1 data. When the weighting factor for the LR1 data is represented by α, the weighting factor β for the LR2 data can be calculated from the following equation:

$$\beta = (1-\alpha)$$

The level_1 represents a threshold value of image data, an image data value smaller than which results in a blurry image. The level_2 represents a threshold value of image data, an image data value larger than which results in a saturated image. Therefore, for a pixel based on the LR1 data whose value is smaller than the level_1 value, the weighting factor α with a value close to 0 is applied to the LR1 data so that the pixel based on the more reliable LR2 data is used. When a pixel is based on the LR1 data whose value is greater than the level-2 value, the weighting factor α with a value close to 1 is applied to the LR1 data so that the pixel based on the LR1 data is used. This is because the pixel based on the LR2 data whose value is greater than the LR1 data value will result in a completely saturated image to be obtained. Such weighting factors α and β are computed for every pixel.

When the weighting factors α and β to be applied to the LR1 and LR2 data respectively are determined for a pixel, the LR1 and LR2 data are added in the CPU 171 (step S7 in FIG. 5). In the CPU 171, the following computation is made to generate combined image data:

$$(\alpha \times LR1 \text{ data value}) + \{(1-\alpha) \times LR2 \text{ data value}\}$$

The combined image data generated as described above has a dynamic range equal to the combined dynamic range of the LR1 and LR2 data. Furthermore, the weighting factors α and β determined based on the values of the LR1 and LR2 data are applied to correct color gradation in the process of combining the image data so that the combined image data represents a high quality image with smooth gradation.

When the same photographic image is to be read with a red light beam three times and over, the combined image data reaching the branch point P2 returns to step S4 to be temporarily stored in the hard disk 176 (step S4, for the second time). The data to be referred to as the LR3 data is then acquired by reading the same photographic image with a red light beam for the third time at a light receiving level different from the light receiving levels LR1 and LR2 (steps S1, S2 and S3, for the third time). The LR3 data and the combined image data are combined after being subjected to level corrections (step S5) and weighting (step S6) to generate a new combined image (step S7). The present embodiment will be further described based on the premise that the same photographic image is read with a red light beam only twice.

When the image reading process using a red light beam is completed, the light source unit 111 emits a green light beam to read the same photographic image as done with a red light beam.

Figure 7:
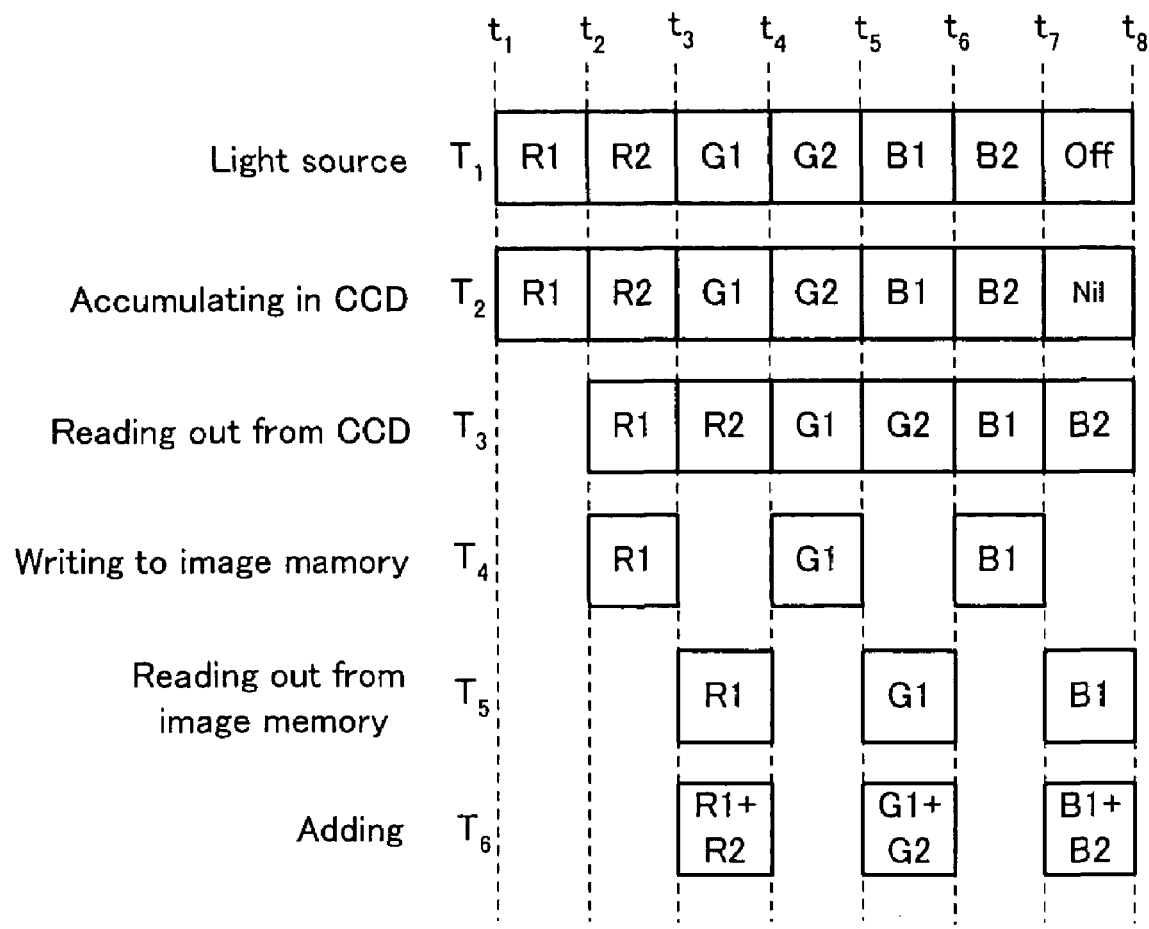
FIG. 7 is a chart showing the timing of image reading processing.

FIG. 7 is a chart showing the timing of image reading.

As shown in the row T1 of the chart, the light source unit 111 emits a red light beam for the first time at time period $t_1$ and for the second time at time $t_2$. Next, the light source unit 111 emits a green light beam for the first time at time $t_3$ and then proceeds to emit a green light beam for the second time to be followed by emission of a blue light beam in the same manner. As shown in the row T2 of the chart, the CCD 115 accumulates electric charge each time the light source unit 111 emits a light beam. That is, the CCD 115 accumulates electric charge for the first time when a red light beam is emitted for the first time at time $t_1$, for the second time when a red light beam is emitted for the second time at time $t_2$, and so on. As shown in the row T3 of the chart, the accumulated electric charge is sequentially read out one cycle after an electric charge accumulation in the CCD, beginning at time period $t_2$. The electric charge read out from the CCD 115 is converted into photographic image data by the A/D converter 118. As shown in the row T4 of the chart, the photographic image data that is generated from the electric charge accumulated when each of the red, green, and blue light beams is emitted for the first time is stored in the hard disk 176 shown in FIG. 3. When the electric charge accumulated when each of the red, green and blue light beams is emitted for the second time is read out, as shown in the row T5 of the chart, the photographic image data generated based on each first-time light beam and stored in the hard disk 176 is also read out, and the two sets of photographic image data generated based on the first-time electric charge accumulation and the second-time electric charge accumulation, respectively, are added as shown in the row T6 of the chart.

When reading the photographic image with each of the red, green and blue light beams for the first time and for the second time, it is preferable to adjust the first-time light receiving level and the second-time light receiving level to be in a ratio of 1:16. In the present embodiment, when the photographic image is read for the first time, the ND filter 114 is inserted to reduce the light receiving level. When the photographic image is read for the second time, the ND filter 114 is removed and pulse-width modulation is adjusted for the light source unit 111 to enhance the light receiving level. In this way, as compared with adjusting only the electric charge accumulation time, an ideal ratio (1:16) of the first-time reception level to the second-time reception level can be achieved much faster.

When reading of the photographic image with each of the red, green and blue light beams is completed as described above, the film carrier 119 shown in FIG. 2 transports the photographic film 20 to allow reading of the next frame to be started.

Only one frame of image is read at a time while the photographic film 20 is kept still, and, only after reading of the current frame of image is completed, the process to read the next frame of image is started. In this way, the chance of error such as image data displacement due to, for example, a positional error in the operation of the film carrier 119 can be reduced. As a result, it becomes easier to obtain an unblurred quality image.

The description of the first embodiment of the image reading apparatus according to the invention is now completed. Hereafter, a second embodiment of the image reading apparatus according to the invention will be described. In the following description of the second embodiment, attention will be paid to the aspects of the second embodiment differing from the first embodiment. The aspects common between the first and the second embodiments will not be described in the following.

Figure 8:
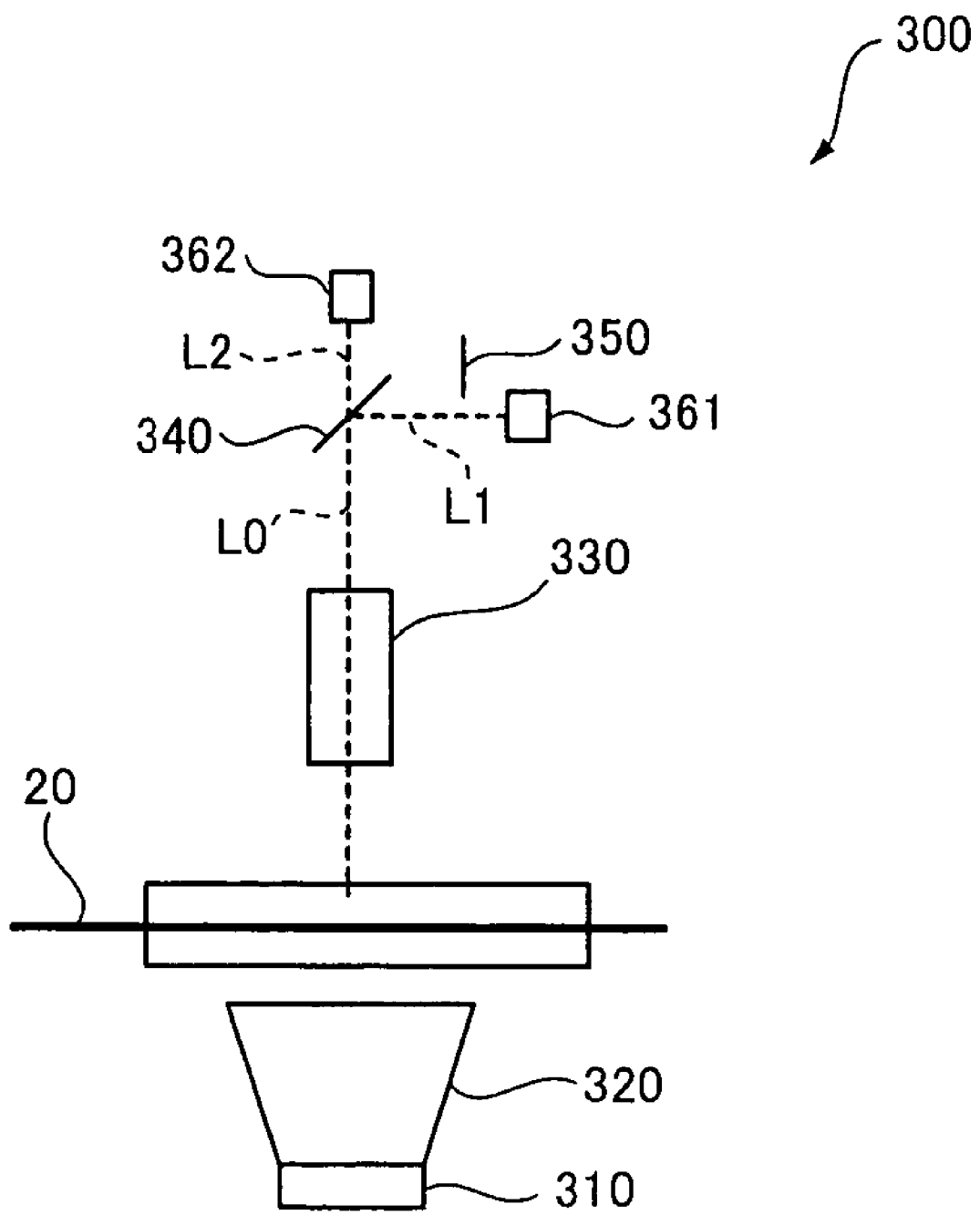
FIG. 8 is a diagram showing a scanner section of a second embodiment.

FIG. 8 is a diagram showing a scanner section of the second embodiment.

A scanner section 300 of the present embodiment includes an LED light source 310, a diffusion box 320, an image pickup lens 330, a half mirror 340, an ND filter 350, a CCD 361 and a CCD 362. The CCD 361 and the CCD 362 constitute an example of plural reading elements according to the invention. The light beam emitted from the LED light source 310 illuminates the half mirror 340 via the image pickup lens 330. The half mirror 340 splits the path L0 of the light beam emitted from the LED light source 310 into the path L1 leading to the CCD 361 and the path L2 leading to the CCD 362. The half mirror 340 constitutes an example of an optical path splitting section included in the image reading apparatus according to the invention.

The CPU 171 shown in FIG. 3 makes the electric charge accumulation time longer at the CCD 362 than at the CCD 361 and controls the ND filter 350 to attenuate the light beam that illuminates the CCD 361 via the optical path L1. Through these means, the ratio of the light receiving level LR1 at the CCD 361 to the light receiving level LR2 at the CCD 362 is adjusted to 1:16. The CCD 361 and the CCD 362 perform image reading at the same time. The photographic image data generated by them are sent to the CPU 171.

Reading an image using more than one CCD simultaneously at plural light receiving levels allows the total time required for image reading to be reduced, thereby contributing toward productivity improvement.

The description of the second embodiment of the invention is now completed.

Next, other embodiments associated with a scanner section will be described.

The CCD 115 of the first embodiment shown in FIG. 2 is a monochrome CCD which merely detects the switching on and off of light. In the following, a scanner section of a third embodiment incorporating a color CCD capable of reading each of the red, green and blue components of light will be described.

The light source 111 included in the scanner section of the third embodiment does not emit red, green and blue light beams separately. It emits white light. In this case, because white light is emitted rather than separate R, G, and B lights from the light source 111, and the color CCD (replacing the CCD 115 shown in FIG. 2) can collect the red, green and blue components included in the transmitted white light simultaneously, the processing time can be reduced. There is a drawback to the color CCD, however. That is, the image obtained using such a color CCD is inferior in quality to the image obtained using a monochrome CCD 115.

Figure 9:
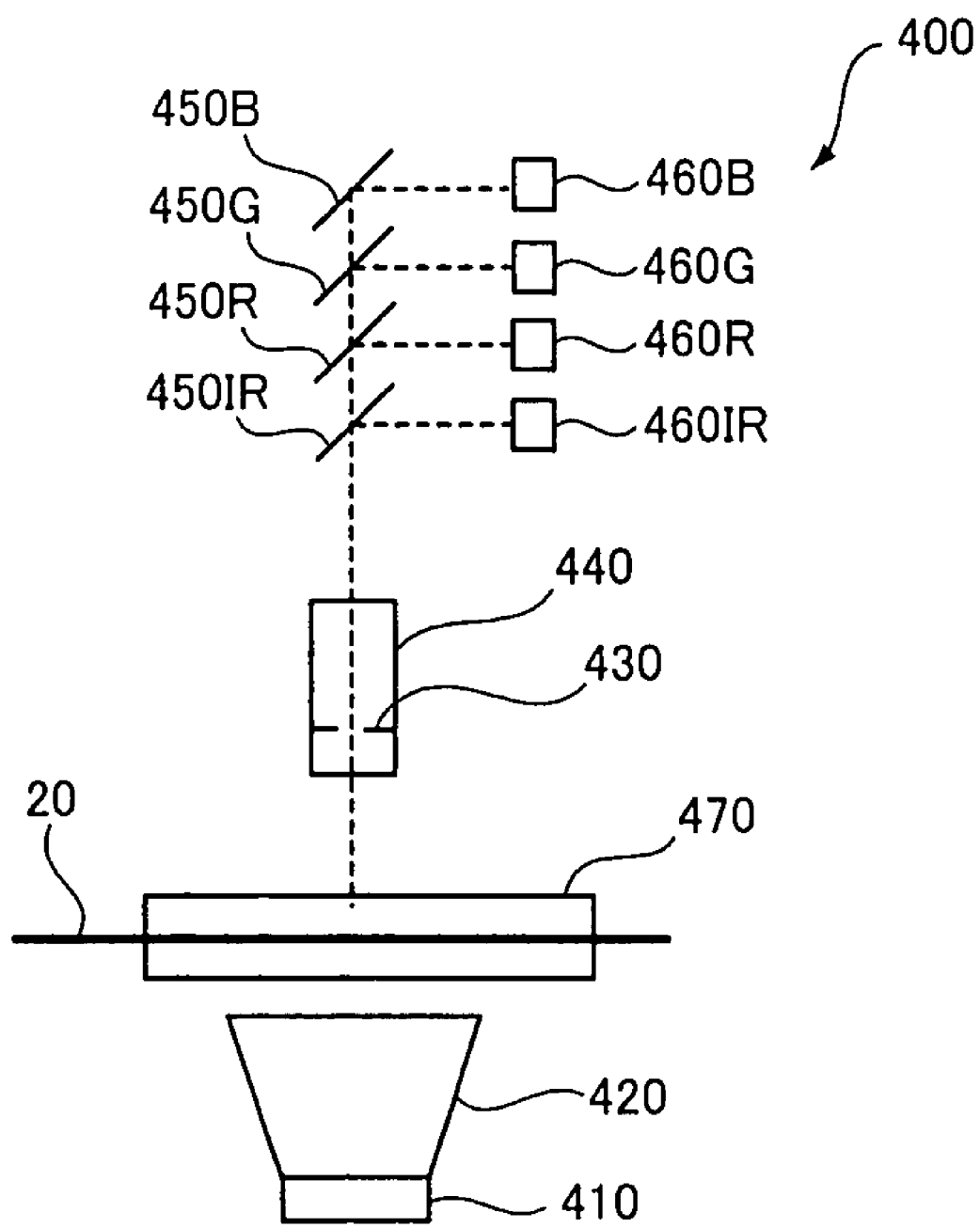
FIG. 9 is a diagram showing an example of a scanner section of a fourth embodiment.

FIG. 9 is a diagram showing an example of a scanner section of a fourth embodiment.

The scanner section 400 of the fourth embodiment includes an LED light source 410, a diffusion box 420, an aperture 430, an image pickup lens 440, dichroic mirrors 450IR ("IR" representing "infrared"), 450R, 450G and 450B, line CCDs 460IR, 460R, 460G, 460B, and a film carrier 470. The LED light source 410 emits a white light beam and an infrared light beam. The light beams illuminate the dichroic mirrors 450IR, 450R, 450G and 450B after being appropriately reduced in amount by the aperture 430. The light beams reflected by the dichroic mirrors 450IR, 450R, 450G and 450B are received by the line CCDs 460IR, 460R, 460G and 460B to generate photographic image data from the respective light beams. The line CCDs 460IR, 460R, 460G and 460B are line sensors which can read an image line by line in the main scanning direction. Every time a line is scanned, the film carrier 470 moves the photographic film 20 in the sub-scanning direction. In the present embodiment, when reading an image, the scanner section 400 can collect red, green, blue image data and also infrared image data simultaneously on each line so that the overall processing time can be reduced. In this arrangement, however, the film carrier 470 moves the photographic film 20 in the sub-scanning direction every time scanning of a line ends so that positional errors may occur in the operation of the film carrier 470 to cause image data displacement.

Figure 10:
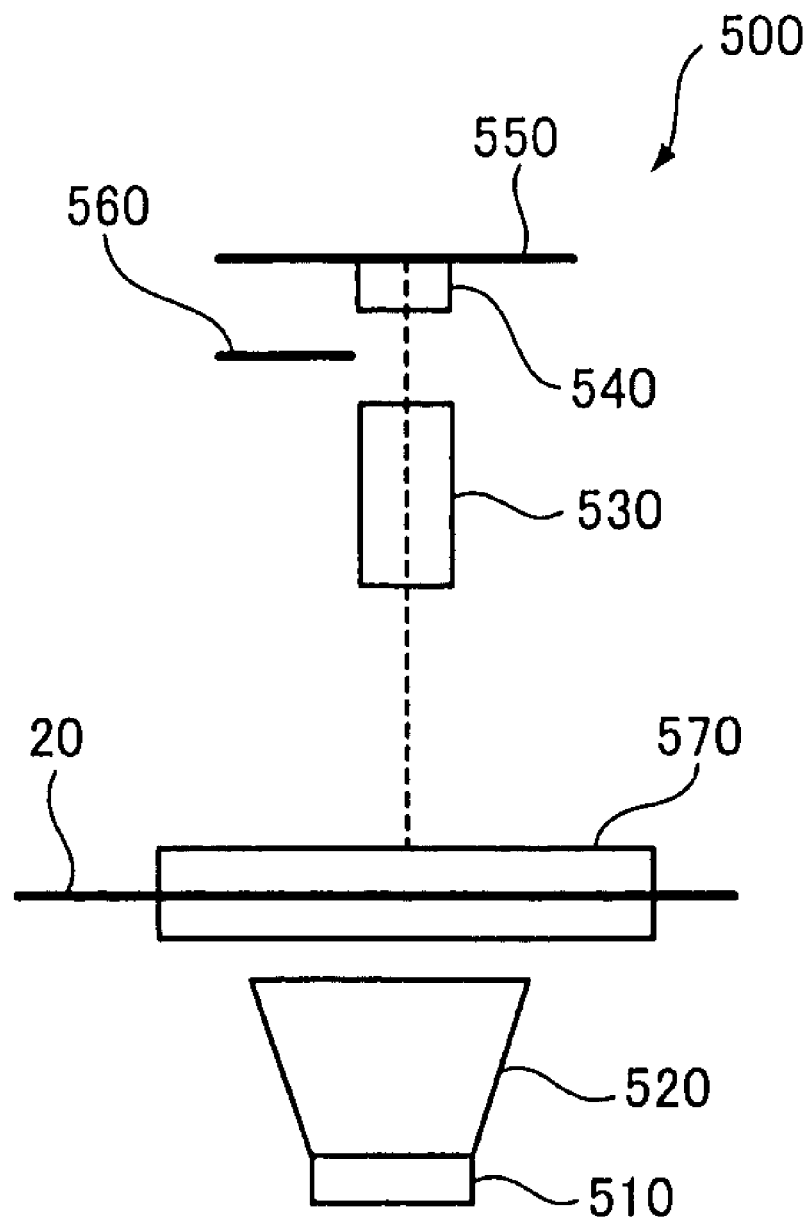
FIG. 10 is a diagram showing an example of a scanner section of a fifth embodiment.

FIG. 10 is a diagram showing an example of a scanner section of a fifth embodiment.

The scanner section 500 of the fifth embodiment includes an LED light source 510, a diffusion box 520, an image pickup lens 530, a 3-line CCD 540, a CCD board 550, an ND filter 560 and a film carrier 570. The LED light source 510 emits white light. The 3-line CCD 540 can collect the red, green and blue components simultaneously for each line of the CCD from the light transmitted from the LED light source 510.

Figure 11:
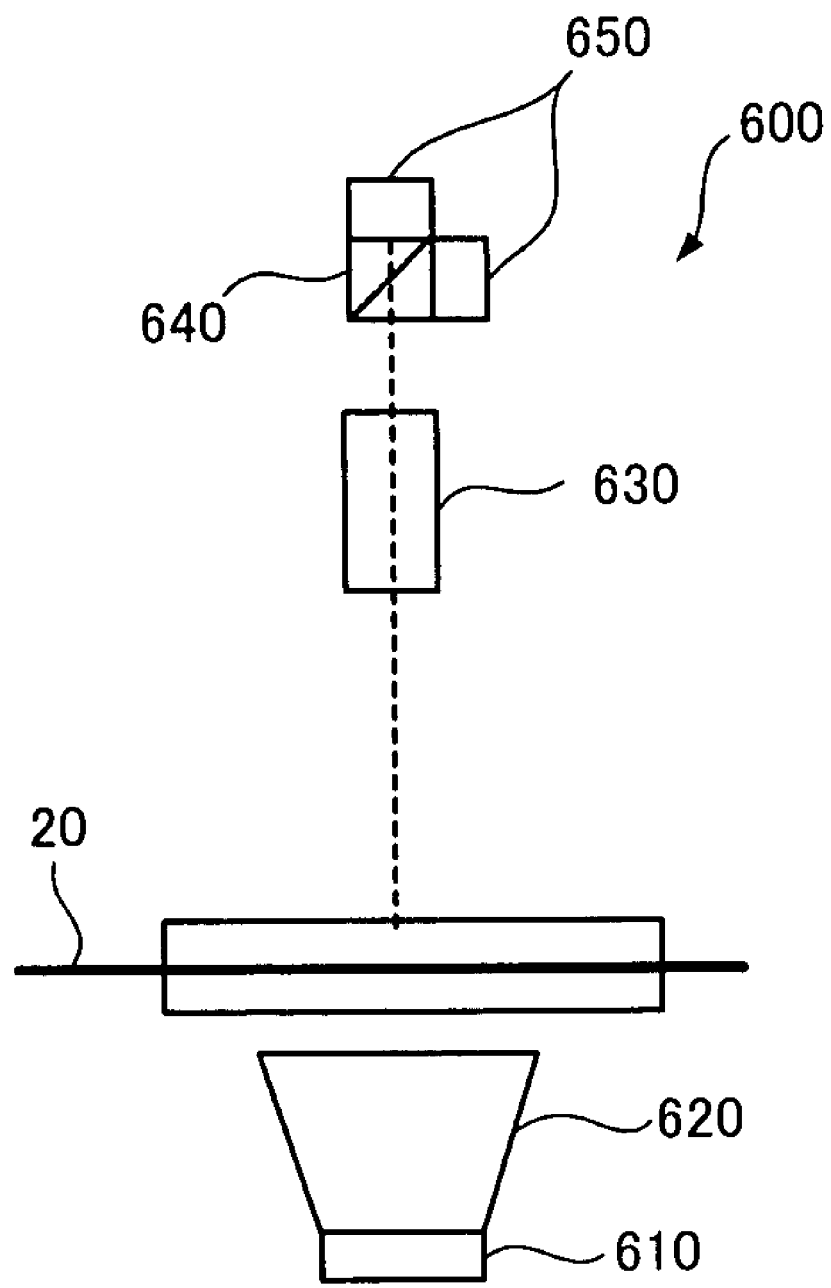
FIG. 11 is a diagram showing an example of a scanner section of a sixth embodiment.

FIG. 11 is a diagram showing an example of a scanner section of a sixth embodiment.

The scanner section 600 of the sixth embodiment has a structure almost the same as that of the scanner section 300 of the second embodiment. The scanner section 600 includes an LED light source 610, a diffusion box 620, an image pickup lens 630, a half prism 640 and two monochrome area CCDs 650. The LED light source 610 sequentially emits red, green, blue, and infrared light beams. When each of these light beams is transmitted to the half prism 640, it is divided into two to be received by the two monochrome area CCDs 650 simultaneously. Even though the scanner section 600 includes no ND filter, it is possible to achieve an ideal light receiving level ratio (1:16), for example, by unequalizing the electric charge accumulation times for the two monochrome area CCDs 650 and also adjusting the amounts of light to be received by the two monochrome area CCDs 650. Like the scanner section 300 of the second embodiment, the scanner section 600 of the sixth embodiment can also generate high quality images at high speed.

Figure 12:
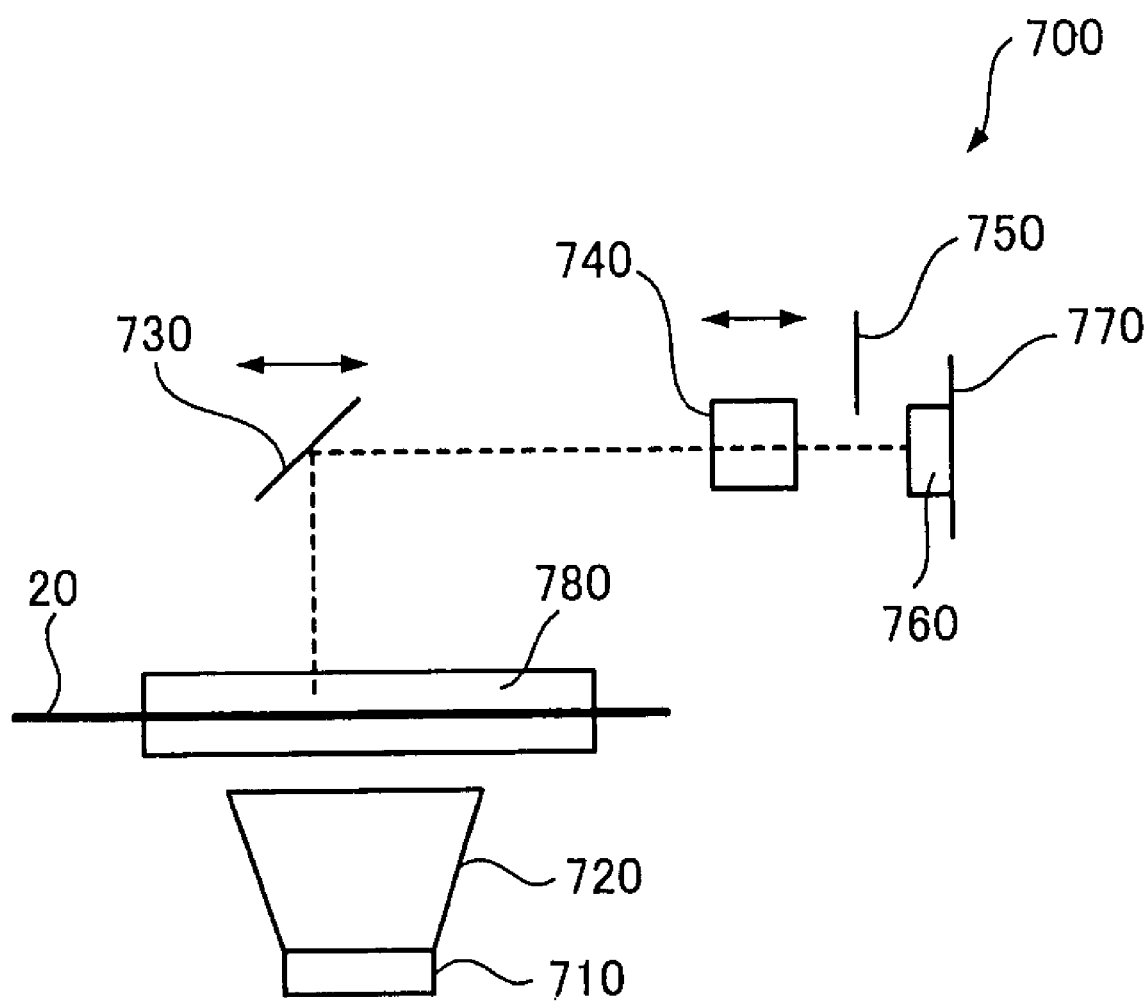
FIG. 12 is a diagram showing a scanner section of a seventh embodiment.

FIG. 12 is a diagram showing a scanner section of a seventh embodiment.

The scanner section 700 of the seventh embodiment includes an LED light source 710, a diffusion box 720, a reflecting mirror 730, an image pickup lens 740, an ND filter 750, a 3-line CCD 760, a CCD board 770 and a film carrier 780. The LED light source 710 emits white light. The 3-line CCD 760 can collect the red, green and blue components simultaneously for each line of the CCD from the light transmitted from the LED light source 710. In the scanner section 700, line shifting for image reading is effected by moving the reflecting mirror 730. Every time reading of a frame of image is completed, the film carrier 780 transports the photographic film 20 to allow the next frame of image to be read. While the scanner section 700 of this embodiment can reduce the overall processing time, it also serves to reduce the degree of line positioning errors as compared with the fourth and the fifth embodiments in which the film carrier is moved to advance image reading from one line to the next.

Embodiments of the image reading apparatus according to the invention in which plural light receiving levels are generated by adjusting an ND filter or pulse width modulation have been described in the foregoing. To generate plural light receiving levels, the first and the second level changing sections according to the invention may use such means as adjusting the light source current or voltage, the electric charge accumulating time at each CCD, or the light transmission factor.

In the embodiments described above, CCDs are used as reading elements, but other reading elements such as MOS devices may also be used in any embodiment of the invention.

The above embodiments of the image reading apparatus according to the invention are for application to a digital image printer. The image reading apparatus according to the invention may also be applied to a general-purpose scanner or copier in which an image is read based on the reflected light obtained by illuminating light from a light source onto the original.

What is claimed is:

1. An image reading apparatus comprising:
   a light source which emits light to illuminate an original;
   a reading section which reads an image of the original by receiving light coming from the original illuminated with light emitted from the light source and generates image data representing the image;
   a first level changing section which changes a light receiving level in the reading section in a first manner used in an imaging system from the light source to the reading section;
   a second level changing section which changes the light receiving level in a second manner different from the first manner and used in the imaging system from the light source to the reading section;
   a control section in which plural light receiving levels are generated by having the light receiving level changed synergistically by the first and the second level changing sections and which causes the reading section to read the image at each of the plural light receiving levels; and
   a combining section which combines plural image data obtained by reading the image at each of the plural light receiving levels.

2. The image reading apparatus according to claim 1, wherein the combining section gives a predetermined weight to each of the plural image data to be combined for each of plural predefined parts of an image.

3. The image reading apparatus according to claim 2, wherein each of the predefined parts represents a minimum unit of a reading resolution of the reading section.

4. The image reading apparatus according to claim 2, wherein the predetermined weight is dependent on a value of the image data.

5. The image reading apparatus according to claim 1, further comprising an original feeding section which sequentially feeds plural originals to a reading position in the reading section where an image of each of the plural originals is read and which keeps an original still in the reading position when an image thereof is being read,
   wherein the control section generates the plural light receiving levels while the original feeding section keeps the original still in the reading position.

6. The image reading apparatus according to claim 1, further comprising an optical path splitting section which splits an optical path formed by the light coming from the original image into plural paths,
   wherein the reading section includes plural reading elements which read an image of the same original respectively via the plural paths generated by splitting the optical path by the optical path splitting section,
   wherein the first level changing section unequalizes the plural light receiving levels at the plural reading elements,
   wherein the second level changing section also unequalizes the plural light receiving levels at the plural reading elements, and
   wherein the control section causes the plural light receiving levels to be generated simultaneously for the plural reading elements by the first and the second level changing sections and causes the plural reading elements to read the image of the same original simultaneously at each of the plural light receiving levels.

* * * * *